(12) United States Patent
Morikawa

(10) Patent No.: US 7,228,552 B2
(45) Date of Patent: Jun. 5, 2007

(54) CHUCKING DEVICE FOR DISK PLAYER AND DISK PLAYER

(75) Inventor: Naoki Morikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 10/821,855

(22) Filed: Apr. 12, 2004

(65) Prior Publication Data

US 2005/0015788 A1    Jan. 20, 2005

(30) Foreign Application Priority Data

Apr. 14, 2003  (JP)  ............... 2003-109610

(51) Int. Cl.
*G11B 33/02* (2006.01)
(52) U.S. Cl. ..................... 720/619; 720/619
(58) Field of Classification Search ................ 720/619, 720/604, 706, 600, 601, 607
See application file for complete search history.

(56) References Cited

U.S. PATENT DOCUMENTS

2005/0086672 A1* 4/2005 Shimozaki ............... 720/619

FOREIGN PATENT DOCUMENTS

JP    2003-059152    2/2003

* cited by examiner

*Primary Examiner*—Allen Cao
(74) *Attorney, Agent, or Firm*—Oblon, Spivak, McClelland, Maier & Neustadt, P.C.

(57) ABSTRACT

In a disk player in that switching between chucking a disk-like recording medium to a turntable and canceling the chucking is performed with forward movement and backward movement of a slider, the slider is maintained stable at an initial position and a forward movement position. A rack member is arranged so as to overlap the slider bottom; a lever is provided so as to have an engaging pin engaging with an engaging hole of the slider and with an engaging hole of the rack member; and moreover, the engaging hole of the rack member includes a first recess and a second recess, so that without an external force applied to the slider, the position of the slider is stably maintained with the engaging pin of the lever at the forward movement position and the initial position.

18 Claims, 15 Drawing Sheets

CHUCKING DEVICE FOR DISK PLAYER AND DISK PLAYER

BACKGROUND OF THE INVENTION

1. Field of the Invention

The present invention relates to a chucking device for a disk player and a disk player, and in particular relates to a chucking device for a disk player capable of chucking operation and canceling the chucking operation in operative association with the forward and back movement of a slidable slider and a disk player having such a chucking device.

2. Description of the Related Art

In general, in a disk player for recording and/or reproducing using a disk recording medium such as a compact disk, in a state that the disk is introduced on a turntable, the disk is pushed on the turntable with a chucking member, and while the disk is driven by the turntable, an optical pick-up is radially moved, thereby writing or reading out a signal.

Therefore, in the disk player, the chucking member must be moved in the chucking direction in synchronous with the insertion of the disk. Then, the disk player has been conventionally provided with a slider which is driven by a motor via a rack/pinion mechanism, thereby switching the chucking operation. The slider is stretched by a tension coil spring in the retracting direction to an initial position. Alternatively, during retraction, with a helical torsion coil spring, the slider is urged in the retracting direction while during progressing, the slider is flicked by an elastic snapping force in the progressing direction.

In such a manner, according to the structure in that the slider for switching the chucking operation is stretched in the retracting direction by the tension coil spring or flicked in the retracting and progressing directions by the helical torsion coil spring, a peak load of slider driving is generated in an unnecessary portion, reducing the operational stability by the additional load. Also, at the moment when the slider is released from the driving, the slider is backward moved to the standby position by the force of the spring, so that noise is produced at this time.

Also, in the conventional backward movement system by the spring, if a driving gear is rotated in the following operation, the slider may be mated with the gear, so that the stability of chucking starting operation may be decreased; a user is unnecessarily disturbed; or operational noise may be produced, causing to deteriorate a commercial value of the disk player.

SUMMARY OF THE INVENTION

The present invention has been made in view of such problems, and it is an object of the present invention to provide a chucking device of a disk player and a disk player in that upon starting following chucking operation, the operation is stably initiated without disturbing a user by solving problems caused by a slider stretched in a backward direction or flicked in retracting and progressing directions by a spring.

A chucking device for a disk player according to the present invention principally includes a motor; a drive gear driven by the motor; a slider disposed slidably on the side of the drive gear; a rack member arranged so as to have an engaging hole as well as to overlap the slider, and connected to the slider with an elastic member therebetween slidably relative to the slider, the rack member having a rack to be mated with the drive gear; and a lever rotatably arranged so as to intersect the rack member and also having a pin engaging with an engaging hole of the slider and with an engaging hole of the rack member, wherein the engaging hole of the rack member includes a first recess for forward moving the rack member relative to the slider during forward moving and a second recess for holding the slider at an initial position with the pin of the lever therebetween by intersecting the engaging hole of the slider when the slider is located at the initial position, and wherein the slider is forward moved via the rack member by the drive gear for chucking operation while the slider is backward moved by the drive gear for canceling the chucking.

Preferably, the chucking device further includes a detecting unit for detecting insertion of a disk, wherein the rack member is forward pushed and mated with the drive gear so as to move the rack member forward with the drive gear while the slider is forward moved via the pin of the slider engaging with the engaging hole of the rack member in operative association with detection by the detecting unit so that. Also, preferably, at a forward movement position of the slider, the pin of the lever is located in an inlet of the first recess of the engaging hole of the rack member, and even when the rack member is further moved forward by the drive gear, the pin of the lever enters the first recess so as not to forward move the slider. Preferably, when the slider is located at a forward movement position, if the drive gear is rotated in reverse, the rack member is backward moved so that the slider is backward moved via the pin of the lever engaging with the engaging hole of the rack member. Also, preferably while the rack of the rack member is mated with the drive gear via the pin of the lever by the rack member, the slider is returned to an initial position. Preferably, in a state that the slider is returned to an initial position, the slider is maintained in position by the pin of the lever engaging with the engaging hole of the slider, and if the rack member is out of engagement with the drive gear, the rack member is relatively moved on the slider by the elastic member so as to return to the initial position.

Preferably, the slider is provided with a rack which is mated with the drive gear only at a position where the slider and the rack member have the same phase. Also, preferably the detecting unit for detecting insertion of a disk includes a disk detection lever which rotates so as to push the rack member in the forward direction if the disk detection lever is pushed by the external periphery of the disk. Preferably, the chucking device further includes a chuck attached at the extremity of a chuck lever for holding the disk to a turn table; an elastic member; and a switching member, wherein the chuck lever is urged in a chucking direction by the elastic member while the switching member pushes up the chuck lever against the elastic member in the chucking-canceling direction, and wherein if the slider moves forward, the switching member is moved in a direction opposite to the chucking-canceling direction.

A disk player according to another aspect of the present invention includes a chucking device defined as described above.

In general, in a mechanism in that a gear is used for power transmitting and another member is driven by this gear, the power transmission between the gear and a slider is normally interrupted and when an external force is applied to the slider, the power is transmitted between the gear and the slider, and when the following steps are repeated:

1. the slider is retracted from the gear;
2. the slider is connected to the gear by an external force;

3. the slider is driven by the gear so as to forward move by a predetermined distance (forward movement until this stage);
4. the gear is reversed and the slider is driven so as to return to a position where can be returned with the gear, if the operation is stopped in the state of 4, the slider may be instantly mated with the gear when the gear rotates in the next.

In order to solve the problems described above, according to a preferred embodiment of the present invention, a lever having a fulcrum on a base chassis is provided, and using the stroke difference of the rotational trajectory of the lever, during the retraction of the slider, the position is locked with the slider so as to securely retain the position. Therefore, in such a structure, by a mechanism without a spring for returning the slider, the positioning of the slider is possible at the initial position or the standby position so that the disturbing a user is eliminated, improving a commercial value of the disk player.

DESCRIPTION OF THE PREFERRED EMBODIMENTS

Structural Description

Figure 1:
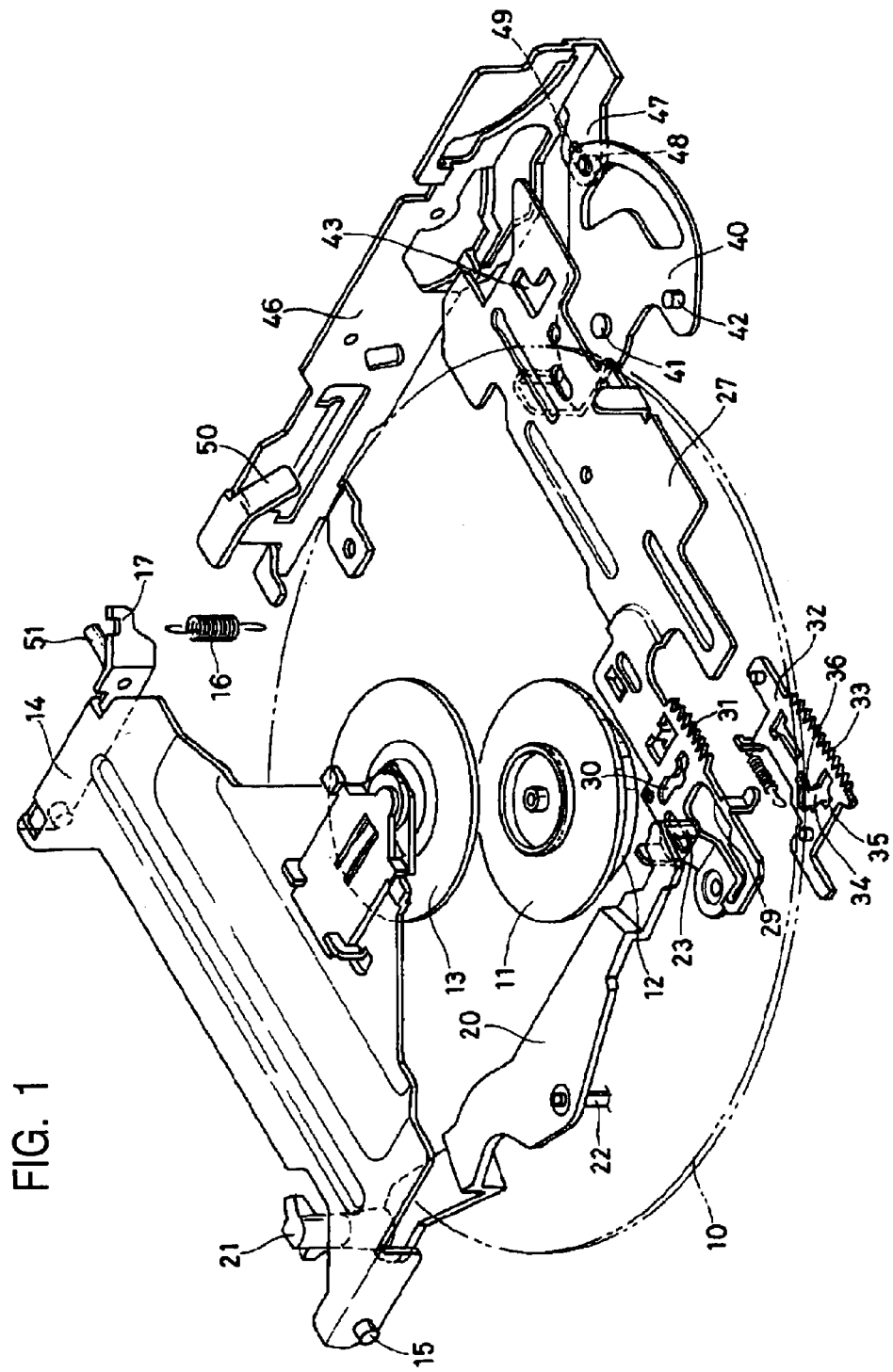
FIG. 1 is a perspective view of an essential part of a chucking device of a disk player.
Figure 2:
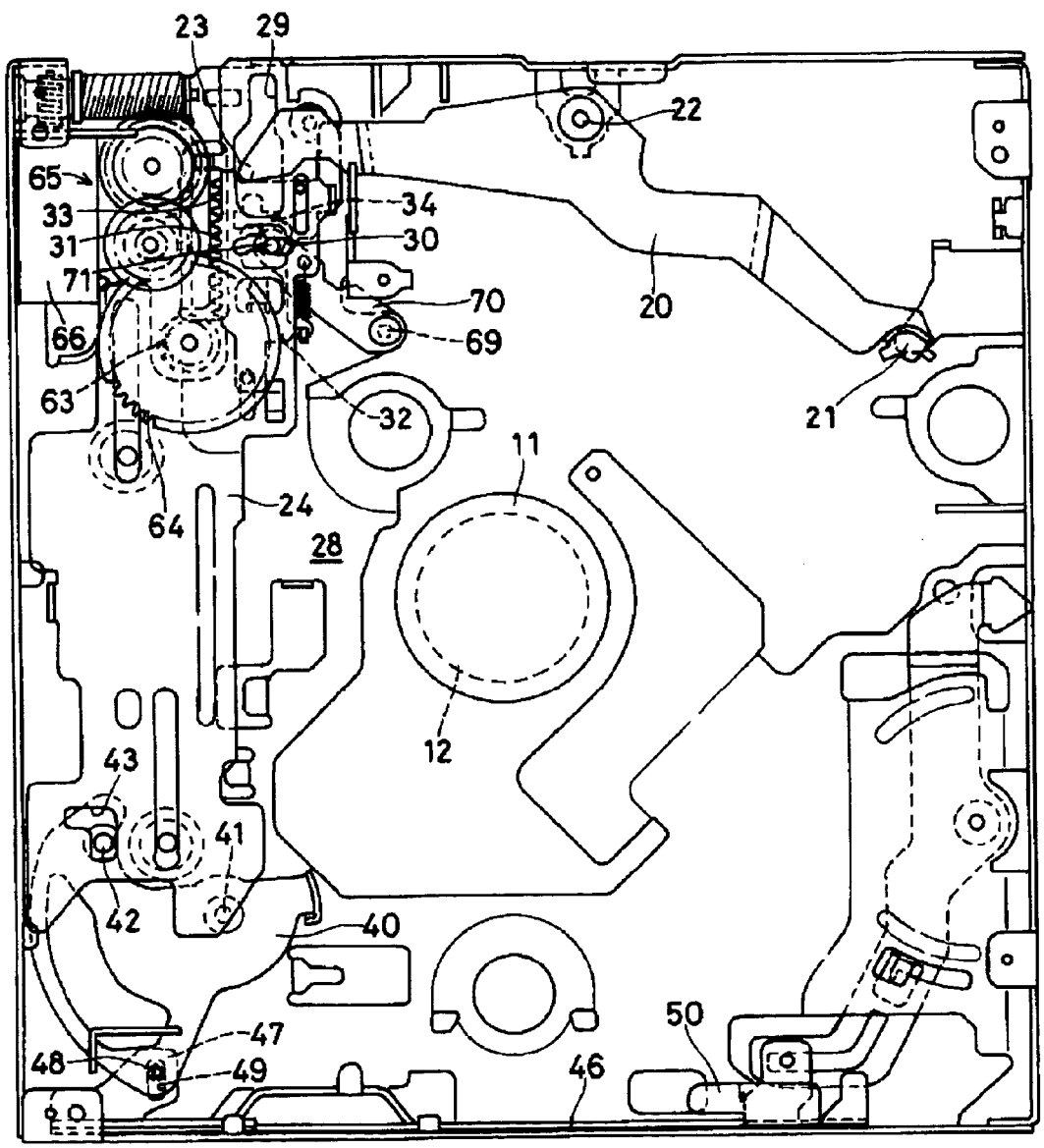
FIG. 2 is a plan view of the essential part.
Figure 3:
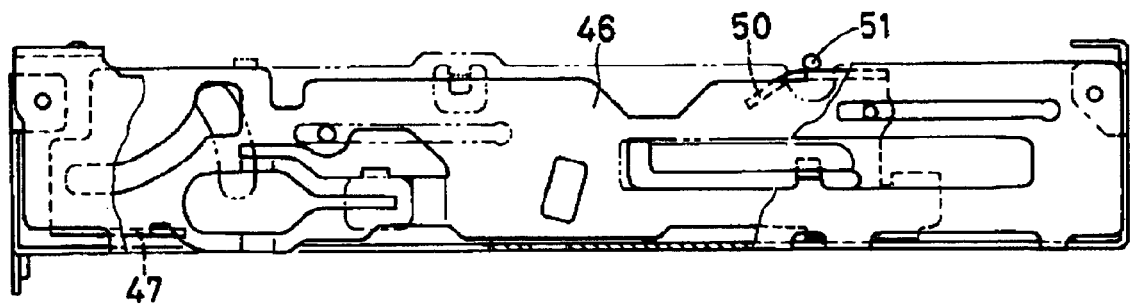
FIG. 3 is a side view of a switching member of the chucking device.

Embodiments according to the present invention will be described below with reference to the drawings. The embodiment relates to a disk player on-vehicle, such as a disk player for recording and/or reproducing using a compact disk (CD) 10. As shown in FIGS. 1 and 2, the compact disk 10 is placed on a turn table 11 provided substantially at the center of this device, and the turn table 11 is directly driven by a spindle motor 12 disposed below the turn table 11. Wherein the compact disk 10 is pushed and held to the turn table 11 by a chucking member 13 arranged above the compact disk 10.

The chucking member 13 is held at the extremity of a chuck lever 14 arranged on the backside of the device. The chuck lever 14 is rotatably supported at fulcrum pins 15, and a tension coil spring 16 is retained to a protruding piece 17 of the chuck lever 14 so as to rotatably urge the chucking member 13 in the chucking direction.

The device is provided with a detection lever 20 disposed outside the turn table 11 and sideward the device. The detection lever 20 having a detection pin 21 arranged at one end is rotatably supported at a fulcrum pin 22. The detection pin 21 is directly pushed by the external periphery of the compact disk 10. Whereas a pushing pin 23 is provided at the other end of the detection lever 20.

In the front of the device, a slider 27 is supported by a chassis 28 slidably in the longitudinal direction. A modified-shape opening 29 is formed at one end of the slider 27, and into the opening 29, the pushing pin 23 of the detection lever 20 is to be entered. The slider 27 is also provided with an elongated engaging hole 30 formed adjacent to the opening 29 and extending in a direction substantially perpendicular to the sliding direction of the slider 27. Furthermore, the slider 27 is provided with a rack 31 fabricated directly thereon.

A rack member 32 is slidably retained to the slider 27 below the slider 27. The rack member 32 includes a rack 33 formed integrally on the side and a modified-shape engaging hole 34 formed thereon. The engaging hole 34 is provided with a first recess 35 extending toward one end and a second recess 36 extending the other end.

Below a position corresponding to the. extremity of the slider 27, a converting lever 40 is arranged and rotatably supported to the chassis 28 via a fulcrum pin 41. An engaging pin 42 studded in the converting lever 40 is engaged with an engaging hole 43 of the slider 27.

A switching member 46 is arranged slidably with the chassis 28 on the side of the disk player oppositely to the detection lever 20 relative to the turn table 11. The switching member 46 is provided with a protruding piece 47 formed at the base lower end, and the protruding piece 47 includes an engaging hole 49 for receiving a pin 48 of the converting lever 40.

The switching member 46 is provided with a pushing piece 50 formed on the upper face at one end. The pushing piece 50 is to push up a pin 51 disposed on the side of the chuck lever 14. That is, if the switching member 46 moves forward on the right in FIG. 2, the pushing piece 50 comes off the pin 51 so that the chuck lever 14 is downward rotated about the fulcrum pins 15 by the tension coil spring 16 so as to push the compact disk 10 to the turn table 11 with the chucking member 13.

Figure 6:
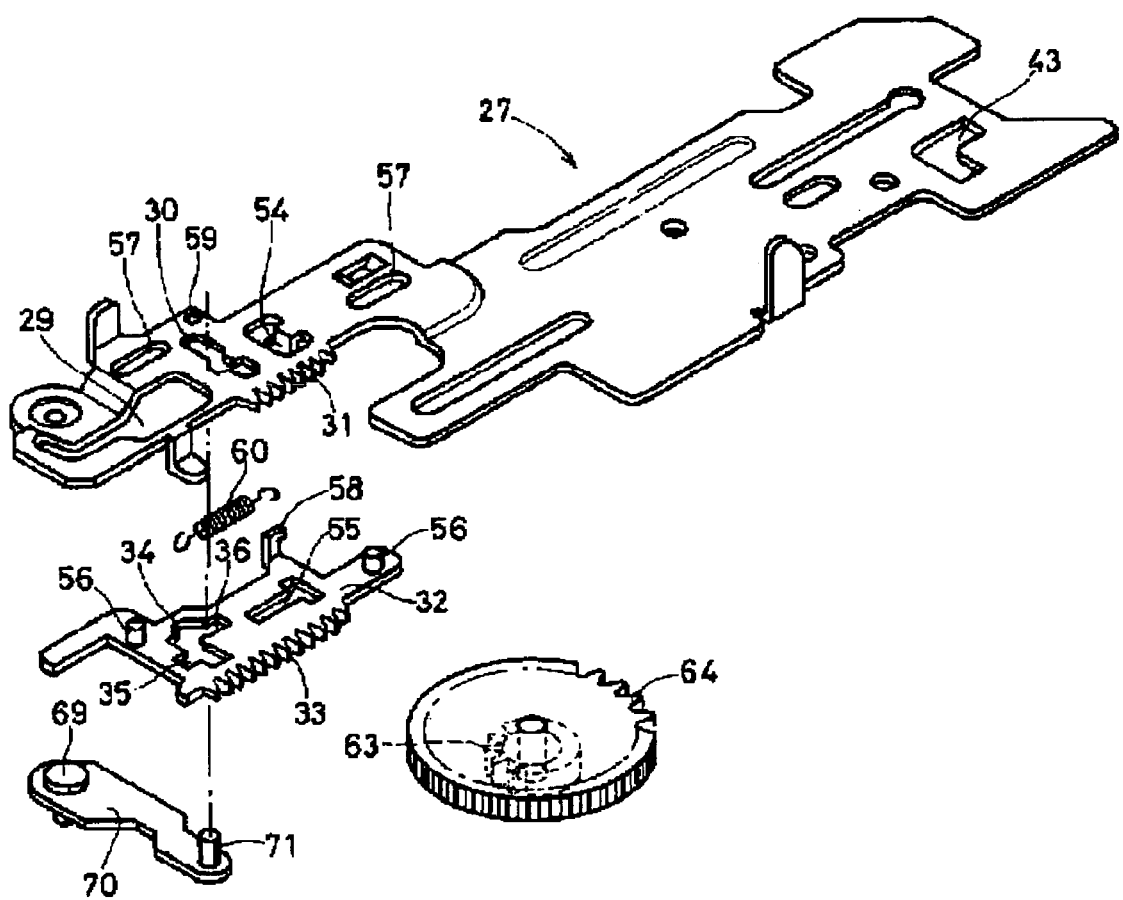
FIG. 6 is an exploded perspective view showing the essential relationship between a slider and a rack member.

Next, the slider 27 for sliding the switching member 46 so as to rotate the chuck lever 14 and the rack member 32 disposed below the slider 27 will be described in detail with reference to FIGS. 6 and 7. The slider 27 is provided with a cut-up claw 54 formed to protrude downward, and the cut-up claw 54 engages with an engaging hole 55 of the rack member 32. The slider 27 is also provided with a pair of slits 57 formed at positions for affixing the rack member 32, and the slits 57 receive a pair of projections 56 formed on the upper surface of the rack member 32, respectively. Thereby, the rack member 32 is slidably held under the slider 27. Moreover, a tension coil spring 60 is stretched between a protruding piece 58 of the rack member 32 and a small hole 59 of the slider 27 so that the rack member 32 is slidably urged relative to the slider 27 to the left in FIG. 7.

A drive gear 63 is arranged on the front side of the slider 27 so as to mate with the rack 33 of the rack member 32 and the rack 31 of the slider 27. The drive gear 63 integrally has a gear 64 which is driven by a motor 66 via a gear train 65 shown in FIG. 1.

A lever 70 is arranged below a position where the slider 27 and the rack member 32 are overlapped with each other. The lever 70 is rotatably supported at a fulcrum pin 69 on the chassis 28 while an engaging pin 71 studded at the extremity of the lever 70 is inserted into the engaging hole 34 of the rack member 32 and the engaging hole 30 of the slider 27.

Figure 7:
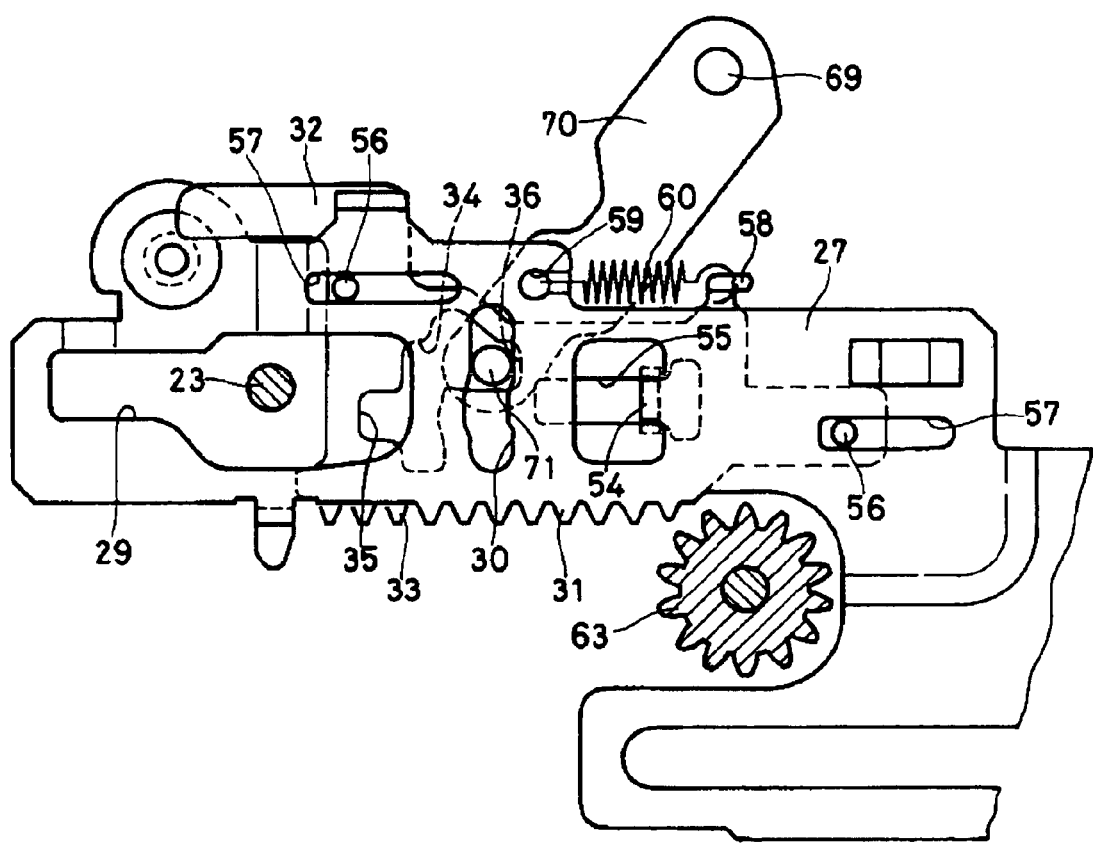
FIG. 7 is a plan view showing the essential relationship between the slider and the rack member in an initial state.

In such a manner, the drive gear 63 shown in FIG. 7 for driving the chucking device of a disk player according to the embodiment is journaled rotatably about a shaft on the chassis 28. The slider 27 is laterally slidable in FIG. 7 by a guiding unit provided on the chassis 28. Below the slider 27, the plastic rack member 32 is arranged so as to be slidable relative to the slider 27 by a predetermined distance. Between the rack member 32 and the slider 27, the tension coil spring 60 is stretched so that the rack member 32 is slidably urged to the left in FIG. 7.

Wherein the specific remarkable feature of a switching mechanism of the slider 27 according to the embodiment is that the slider 27 is not provided with a spring for urging to the left relative to the chassis 28 so as to backward move to an initial position or a standby position. Instead of the spring, the embodiment is remarkably characterized in that there is provided the lever 70 rotatably supported by the fulcrum pin 69 on the chassis 28, and the engaging pin 71 disposed at the extremity of the lever 70 is engaged into the engaging hole 34 of the rack member 32 and the engaging hole 30 of the slider 27.

Description of Operation and Functions

Next, the operation of the chucking device of a disk player structured as above will be described. FIG. 7 shows an initial state, and the drive gear 63 is clockwise rotated at this time while other operations, the loading operation of the compact disk 10 in particular, are performed by the output of the motor 66 for driving the drive gear 63. Therefore, in this case, the rack 33 of the rack member 32 and the rack 31 of the slider 27 are securely retracted such that an additional load is not applied to the motor 66.

Figure 8:
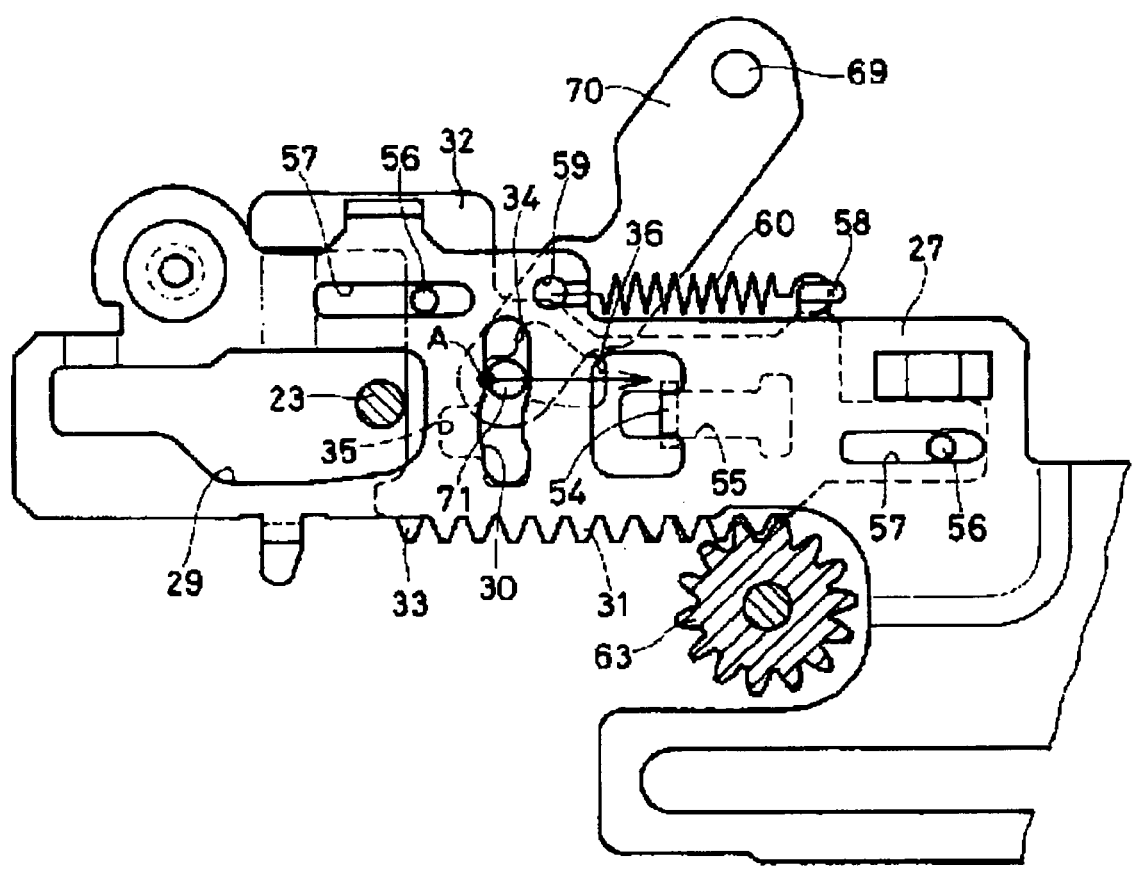
FIG. 8 is a plan view showing the essential forward movement of the slider.

Upon completion of the loading operation of the compact disk 10 in such a state, the extremity of the external periphery of the compact disk 10 pushes the detection pin 21 of the detection lever 20 shown in FIGS. 1 and 2. Therefore, the detection pin 21 is counterclockwise rotated in FIG. 2 about the fulcrum pin 22. Accordingly, the pushing pin 23 of the detection lever 20 moves to the right within the opening 29 of the slider 27 so as to push the rack member 32 to the right as shown in FIG. 8. Thereby, the rack 33 of the rack member 32 is mated with the drive gear 63. Therefore, by the clockwise rotating drive gear 63, the rack member 32 is pushed to the right in FIG. 7 so that a point A of the engaging hole 34 of the rack member 32 is engaged with the engaging pin 71 of the lever 70. Then, the engaging pin 71 pushes the wall of the engaging hole 30 so that the slider 27 moves together with the rack member 32 via the engaging pin 71 of the lever 70.

Figure 9:
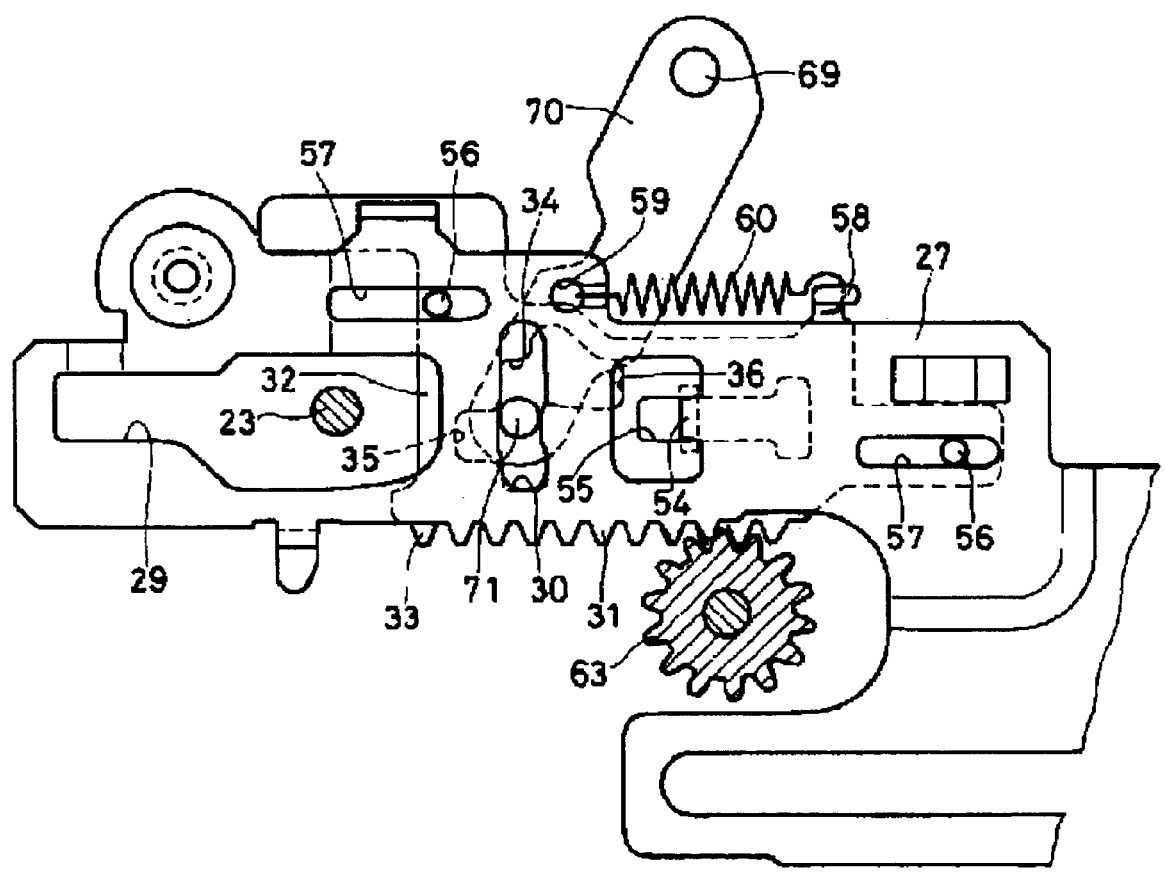
FIG. 9 is a plan view showing the essential forward operation of the slider.

In such a manner, as shown in FIG. 9, the slider 27 and the rack member 32 are moved by the drive gear 63 maintaining their relative positional relationship constant. At the position shown in FIG. 9, the drive gear 63 is mated with not only the rack 33 of the rack member 32 but also the rack 31 of the slider 27. Therefore, the output of the drive gear 63 is transmitted to the slider 27 not only via the rack member 32 but also the slider 27 is directly driven by the drive gear 63.

The rack 31 of the slider 27 is not necessarily required, and only the rack 33 of the rack member 32 may be provided. However, in this case, since the entire driving power goes through the rack 33 of the rack member 32, a large load is applied to the rack 33. Therefore, by providing the rack 31 in the slider 27, the load of the rack 33 of the rack member 32 can be alleviated. Accordingly, the rack 31 of the slider 27 is auxiliarily provided, so that the drive gear 63 is mated with the rack 31 only when the rack member 32 and the slider 27 move having the same phase, and the rack 31 of the slider 27 is smaller in length than the rack 33 of the rack member 32.

Figure 10:
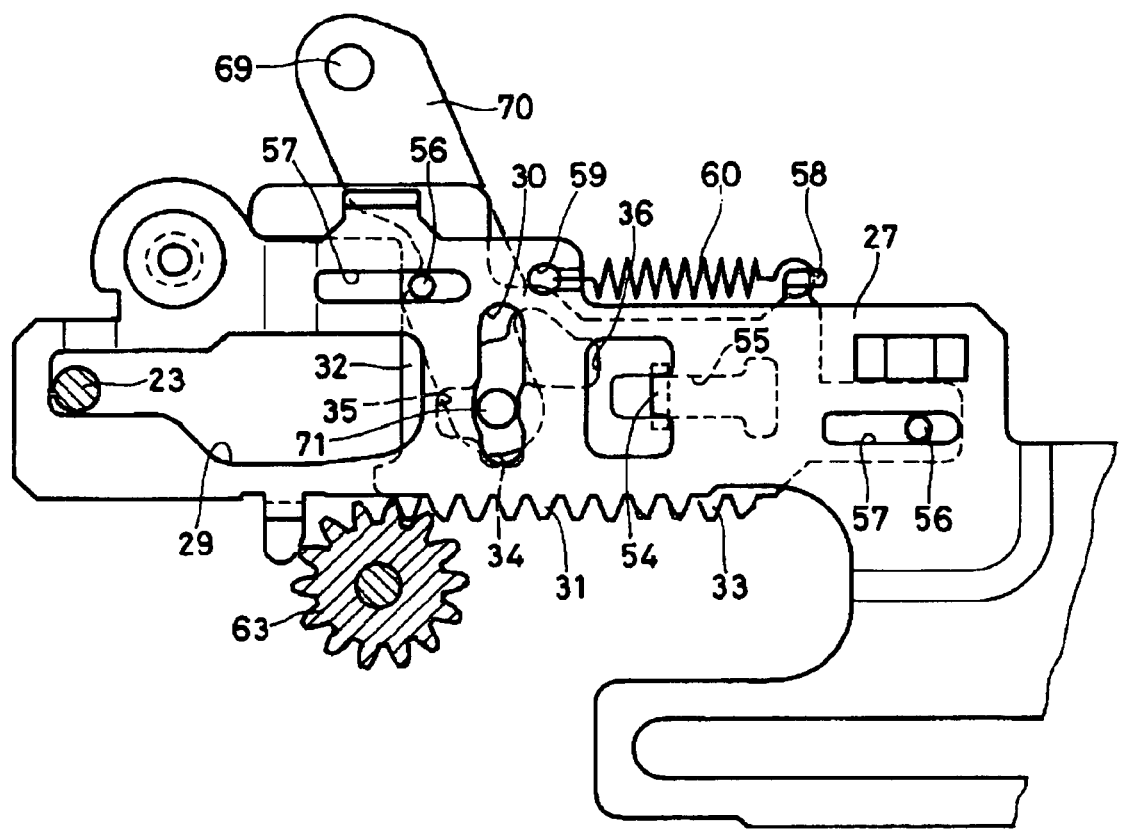
FIG. 10 is a plan view of an essential state that forward operation is completed.

As shown in FIG. 10, the rack member 32 is moved to a position where the lever 70 is pushed to the utmost, so that the ultimate stroke of the slider 27 above the rack member 32 is established. This position is the forward movement position of the slider 27.

Figure 4:
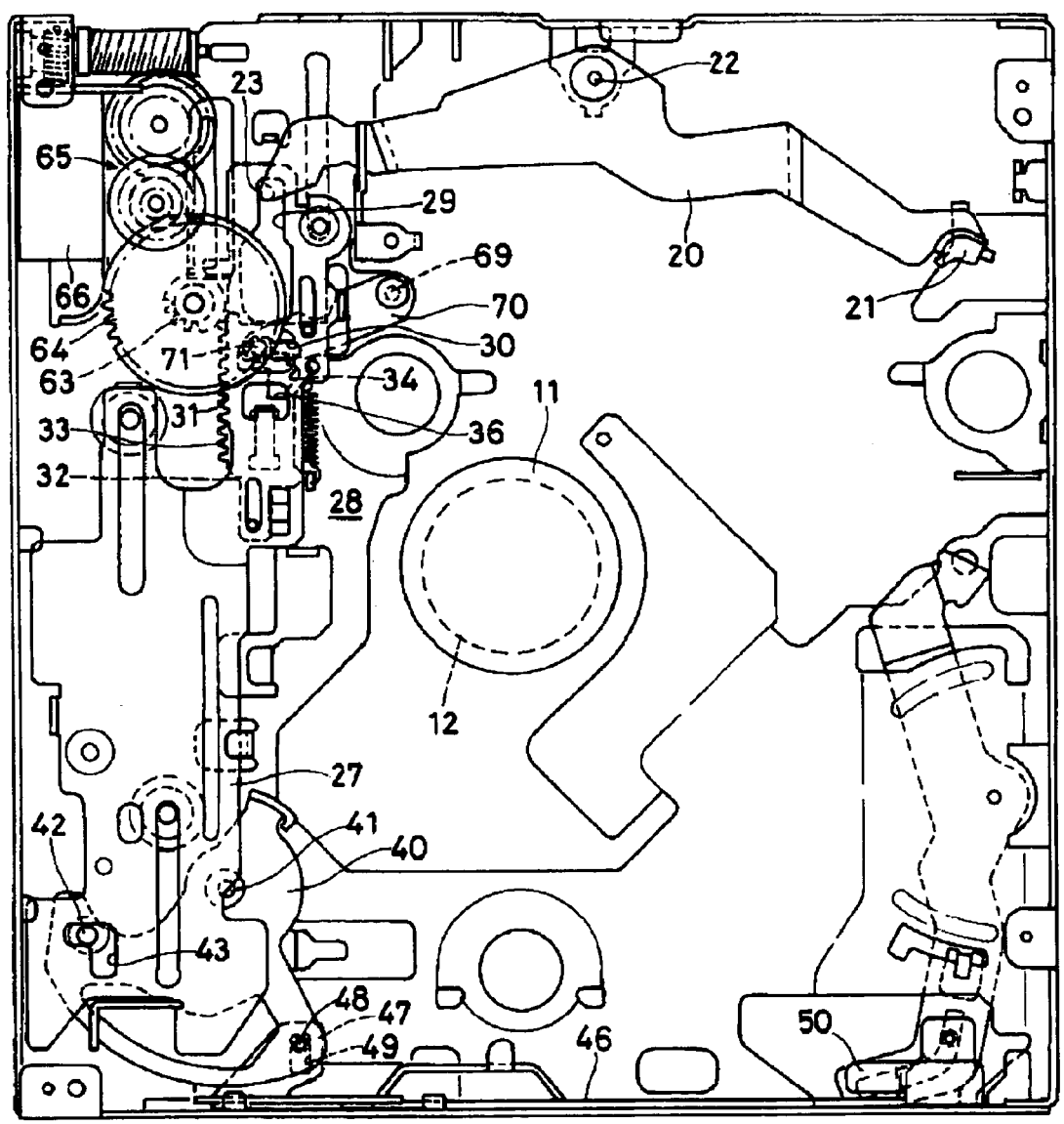
FIG. 4 is a plan view of an essential part of the chucking device in a state that chucking operation is completed.
Figure 5:
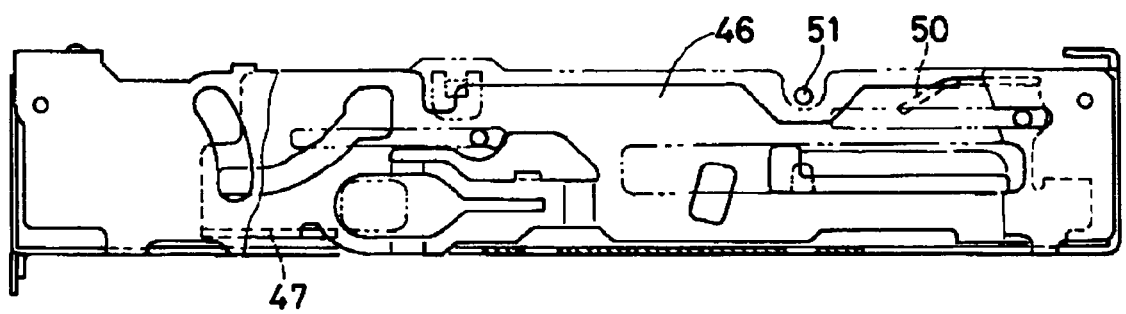
FIG. 5 is a side view of an essential part of the switching member in the state that chucking operation is completed.

When the slider 27 is forward moved to the ultimate stroke as mentioned above, as shown in FIGS. 4 and 5, the converting lever 40 is counterclockwise rotated about the fulcrum pin 41 so that the pin 48 of the converting lever 40 pushes the switching member 46 to the right in FIGS. 4 and 5 via the engaging hole 49 of the protrusion piece 47 of the switching member 46. Accordingly, the pushing piece 50 of the switching member 46 is displaced from the pin 51. Since the pin 51 is arranged on the side of the chuck lever 14 as mentioned above, if the pushing piece 50 is retracted, the chuck lever 14 is pulled by the tension coil spring 16, so that the chucking member 13 held to the extremity of the chuck lever 14 pushes the compact disk 10 to the turn table 11. Thereby, the chucking operation of the compact disk 10 is completed.

Figure 11:
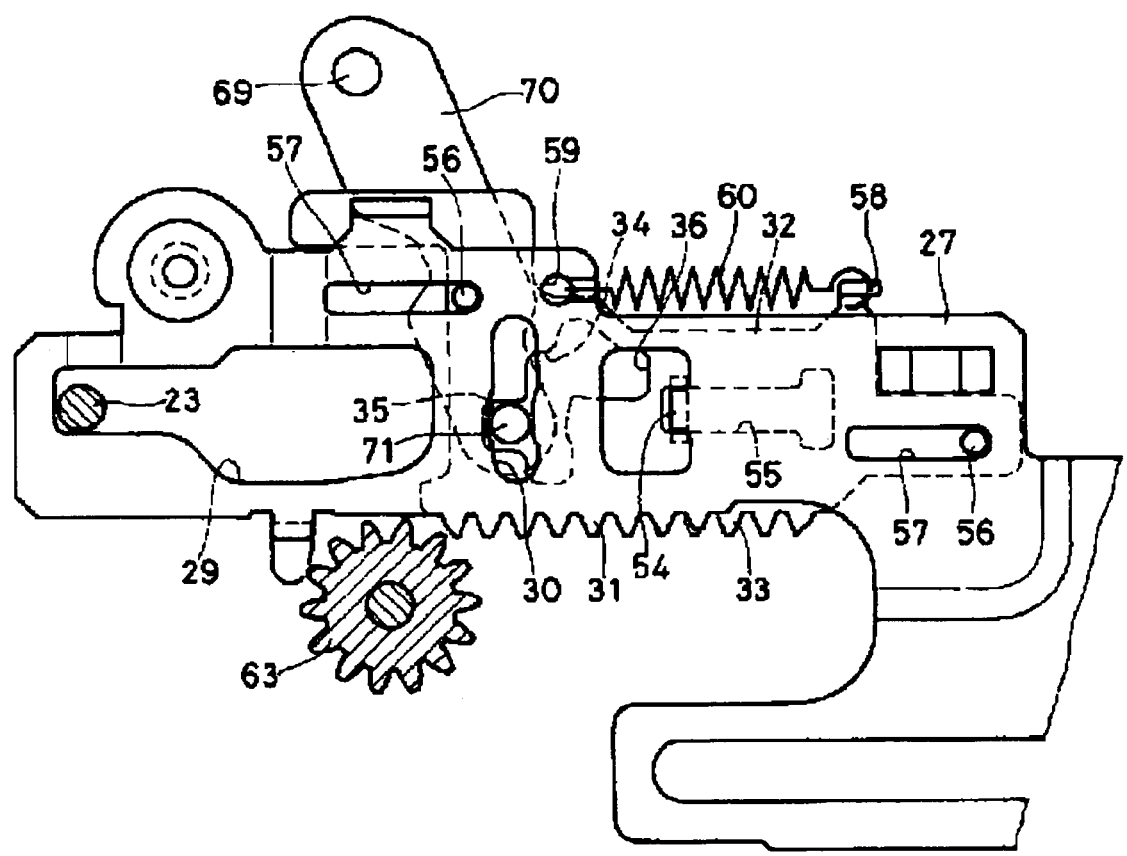
FIG. 11 is a plan view of an essential state that the rack member is moved by a spring.

In a state that the slider 27 is forward moved to the position shown in FIG. 10, if the drive gear 63 is reversed by the motor 66, in order that the drive gear 63 is securely mated with the rack 33 of the rack member 32 for preparing the following backward movement, the rack member 32 and the slider 27 must be stopped at the position shown in FIG. 10, and is not allowed to forward move further. Whereas, according to the embodiment, the engaging hole 34 of the rack member 32 is provided with a first recess 35, so that even if the rack member 32 is moved by the drive gear 63 to the right further than the position shown in FIG. 10, the engaging pin 71 of the lever 70 enters the first recess 35 relatively as shown in FIG. 11, thereby not pushing the slider 27 with the engaging pin 71. Moreover, since the rack member 32 is connected to the slider 27 through the tension coil spring 60, if the drive gear 63 comes out of engagement with the rack 33, the rack member 32 is always returned to the position shown in FIG. 10.

Figure 12:
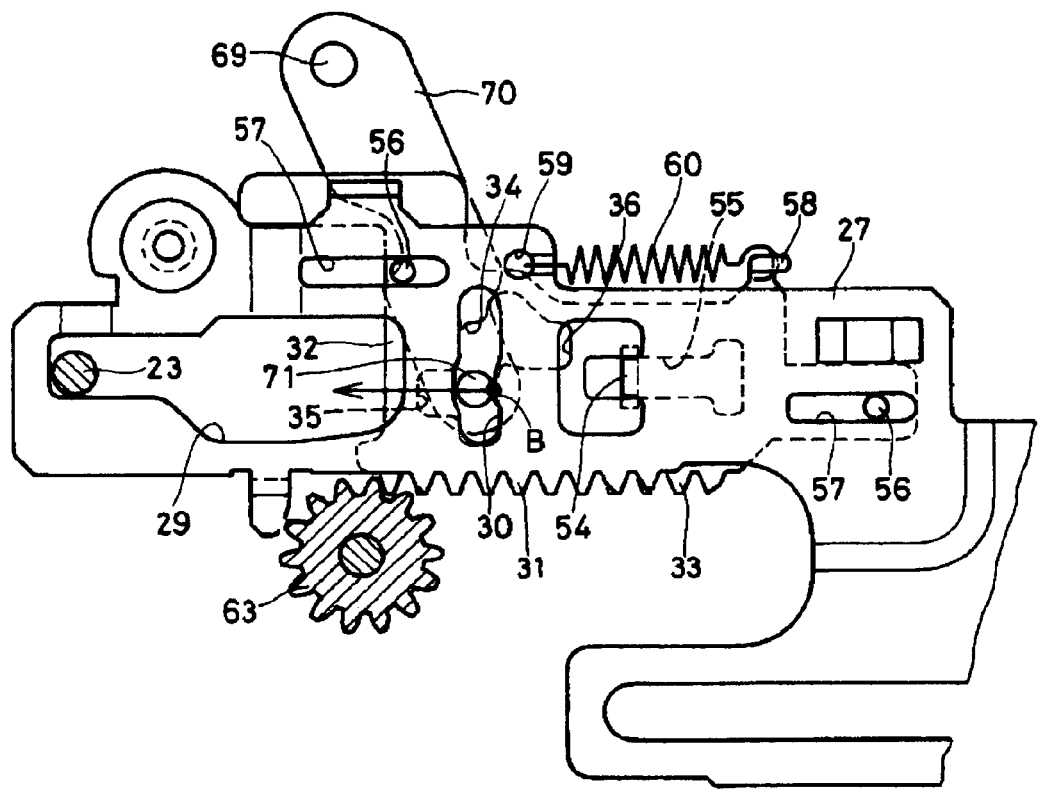
FIG. 12 a plan view showing the essential backward operation of the slider.
Figure 13:
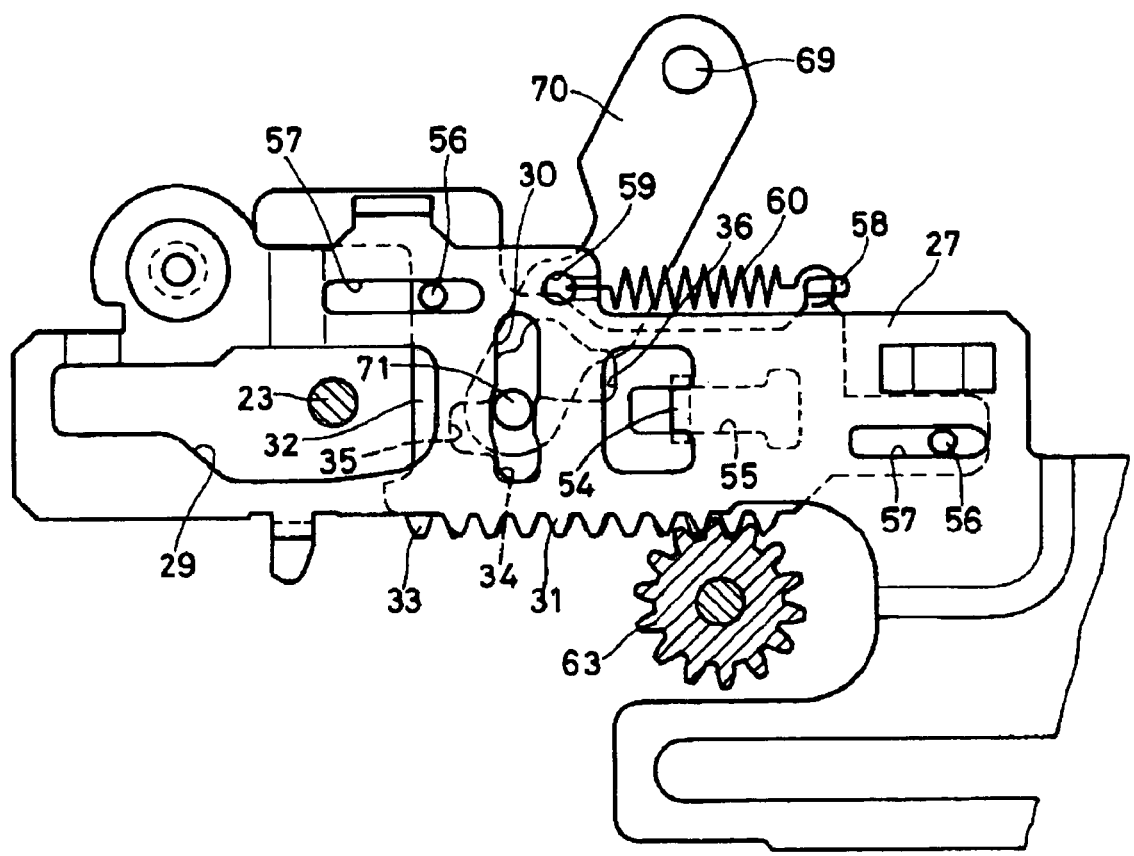
FIG. 13 is a plan view showing the essential backward operation of the slider.

Next, the backward movement of the slider 27 for canceling the chucking will be described. The backward movement of the slider 27 is performed by reversing the drive gear 63, i.e., by the counterclockwise rotation, in the state shown in FIG. 10. When the rack member 32 is moved to the left by the drive gear 63, the engaging pin 71 of the lever 70 located within the engaging hole 34 of the rack member 32 is thereby pushed with the point B of the engaging hole 34, so that the engaging pin 71 pushes the wall of the engaging hole 30 of the slider 27 to the left, thereby pushing the slider 27 to the left, as shown in FIG. 12. Then, as shown in FIG. 13, the slider 27 and the rack member 32 are driven by the drive gear 63 maintaining a predetermined relative positional relationship with the engaging pin 71 of the lever 70 therebetween. At this time, the rack 33 of the rack member 32 and the rack 31 of the slider 27 are driven together by the drive gear 63.

Figure 14:
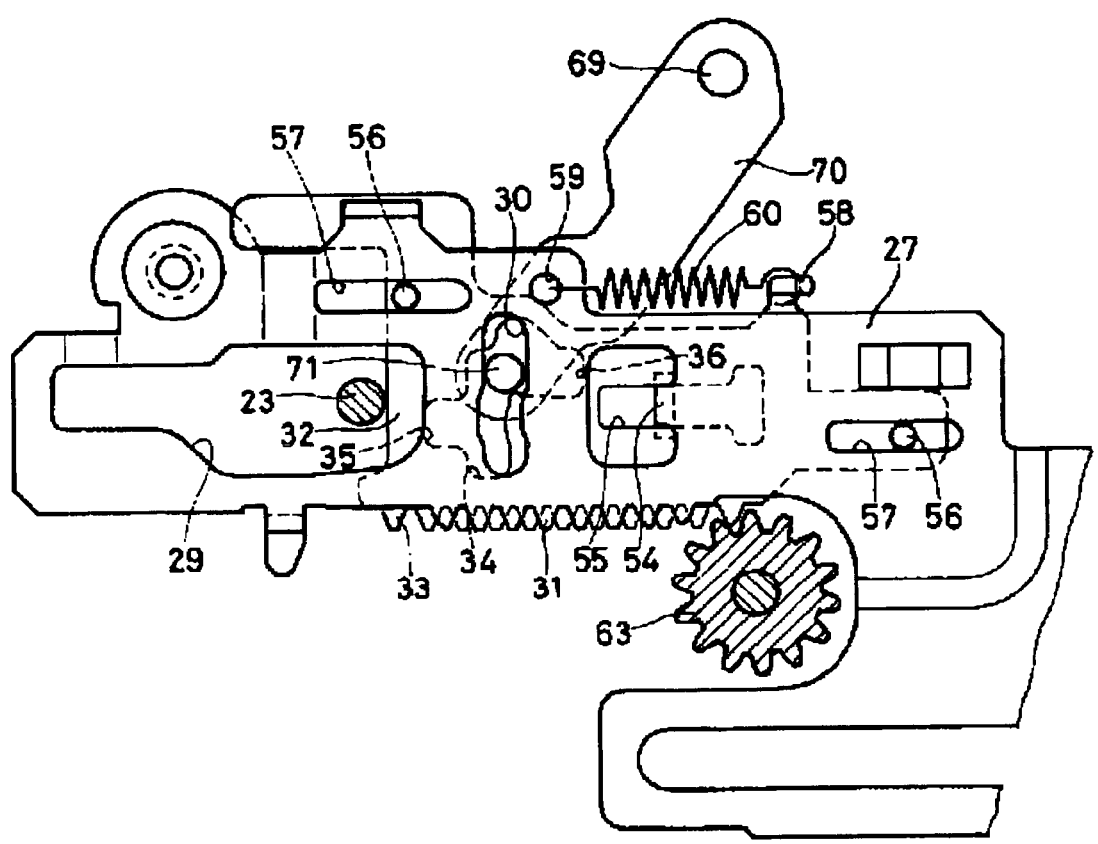
FIG. 14 is a plan view showing the essential backward operation of the slider.

Then, as shown in FIG. 14, the engaging pin 71 is pushed with the wall of the engaging hole 34 of the rack member 32, so that while the drive gear 63 is mated with the rack 33 of the rack member 32, the slider 27 is securely returned to an initial position via the engaging pin 71. Thereafter, as shown in FIG. 15, the drive gear 63 is brought out of engagement with the rack 33 of the rack member 32, so that the rack member 32 is freed therefrom and returned on the slider 27 to the initial position by the tension coil spring 60 pulling the rack member 32.

Figure 15:
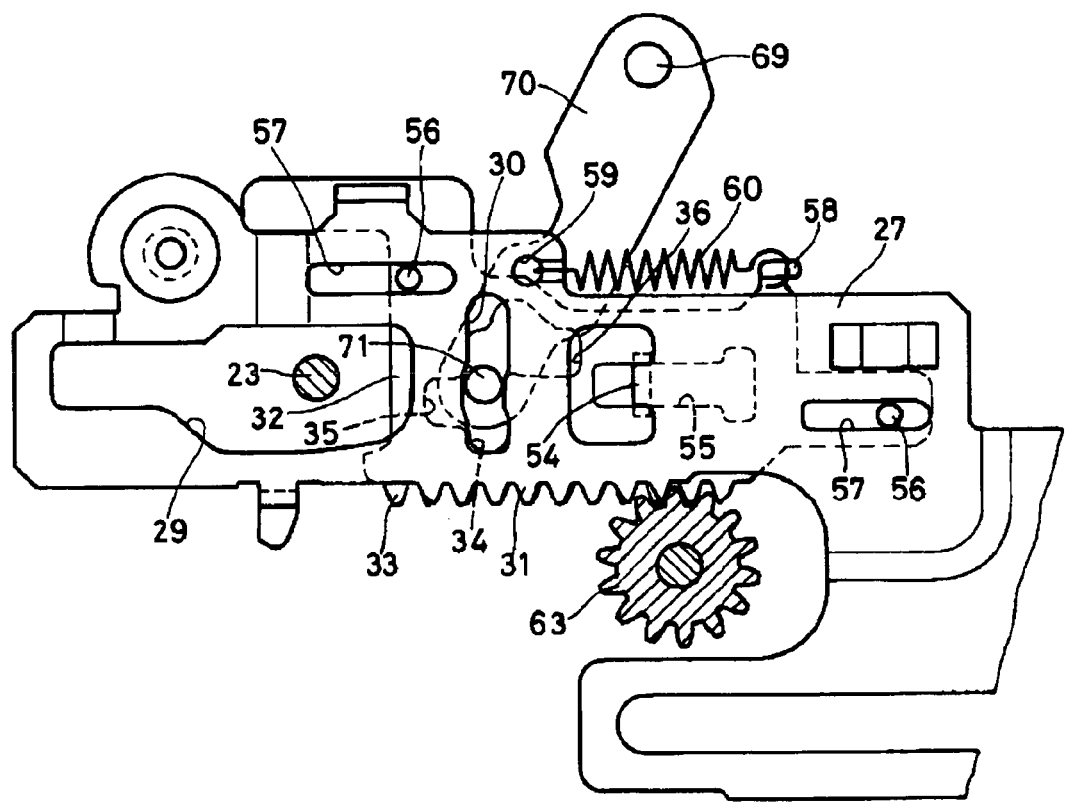
FIG. 15 is a plan view of an essential state of the slider returned to an initial state.

Even in the state that the rack 33 of the rack member 32 is separated from the drive gear 63 as shown in FIG. 15, the engaging pin 71 of the lever 70 enters the engaging hole 30 of the slider 27 and the engaging hole 34 of the rack member 32 or the second recess 36, so that the engagement between the slider 27 and the engaging pin 71 is maintained only at the position where the engaging hole 30 of the slider 27 and the engaging hole 34 of the rack member 32 are overlapped with each other. Thereby, without applying an external force to the slider 27 with a spring, etc., the initial position itself of the slider 27 can be maintained at the initial position shown in FIG. 7. Therefore, the slider 27 stands ready for smooth transition to the following chucking operation.

When it is assumed that the lever 70 having the engaging pin 71 does not exist, although the forward movement of the slider 27 is possible, after the drive gear 63 is reversed, the positional relationship between the slider 27 and the rack member 32 cannot be maintained constant at the position shown in FIG. 13. Therefore, the rack member 32 is returned to the initial position on the slider 27 by the tension coil spring 60. Then, since the slider 27 is not returned to the initial position yet when the rack member 32 is brought out of engagement with the drive gear 63, operation failure arises in that upon starting the following loading operation, when the drive gear 63 starts to move forward, the slider 27 moves to the right suddenly.

However, in the above-mentioned operation failure, by providing the lever 70 having the engaging pin 71 and by securely returning the slider 27 to the initial position, i.e., the position shown in FIGS. 7 and 15, the operation failure that the slider 27 suddenly moves on the right can be avoided because the rack 33 of the rack member 32 is separated from the drive gear 63 even when the drive gear 63 is normally rotated. Therefore, not only unnecessary operational noise can be reduced but also operational stability is improved, thereby increasing reliability of the disk player.

The present invention has been described with reference to the embodiment illustrated by the drawings; however, the invention is not limited to the embodiment described above, and various modifications may be made within the scope and sprit of the present invention. For example, the embodiment relates to a disk player on-vehicle; however, the invention is not necessarily limited to the disk player on-vehicle, and may also be incorporated in a stationary disk player. Also, the invention is not necessarily limited to a chucking device of a compact disk, and may also be applied to a chucking device of disk players using other disk recording media such as a DVD player.

According to the present invention, a chucking device for a disk player principally includes a motor; a drive gear driven by the motor; a slider disposed slidably on the side of the drive gear; a rack member arranged so as to have an engaging hole as well as to overlap the slider, and connected to the slider with an elastic member therebetween slidably relative to the slider, the rack member having a rack to be mated with the drive gear; and a lever rotatably arranged so as to intersect the rack member and also having a pin engaging with an engaging hole of the slider and with an engaging hole of the rack member, wherein the engaging hole of the rack member comprises a first recess for forward moving the rack member relative to the slider during forward moving and a second recess for holding the slider at an initial position with the pin of the lever therebetween by intersecting the engaging hole of the slider when the slider is located at the initial position, and wherein the slider is forward moved via the rack member by the drive gear for chucking operation while the slider is backward moved by the drive gear for canceling the chucking.

Therefore, in such a chucking device of a disk player, the positional holding of the slider at forward and backward movement positions can be performed with the lever having the engaging pin engaging with the engaging hole of the slider, so that the over stroke of the rack member at one of the forward and backward movement positions can be absorbed by the first recess of the engaging hole of the rack member while the over stroke of the rack member at the other of the forward and backward movement positions can be absorbed by the second recess of the engaging hole of the rack member.

What is claimed is:

1. A chucking device for a disk player comprising:
   a motor;
   a drive gear driven by the motor;
   a slider disposed slidably on the side of the drive gear;
   a rack member arranged so as to have an engaging hole as well as to overlap the slider, and connected to the slider with an elastic member therebetween slidably relative to the slider, the rack member having a rack to be mated with the drive gear; and
   a lever rotatably arranged so as to intersect the rack member and also having a pin engaging with an engaging hole of the slider and with said engaging hole of the rack member,
   wherein the engaging hole of the rack member comprises a first recess for forward moving the rack member relative to the slider during forward moving and a second recess for holding the slider at an initial position with the pin of the lever therebetween by intersecting the engaging hole of the slider when the slider is located at the initial position, and
   wherein the slider is forward moved via the rack member by the drive gear for chucking operation while the slider is backward moved by the drive gear for canceling the chucking operation.

2. A device according to claim 1, further comprising detecting means for detecting insertion of a disk,
   wherein the rack member is operatively associated with detection by the detecting means so that the rack member is forward pushed and mated with the drive gear so as to move the rack member forward with the drive gear while the slider is forward moved via the pin of the slider engaging with the engaging hole of the rack member.

3. A device according to claim 1, wherein at a forward movement position of the slider, the pin of the lever is located in an inlet of the first recess of the engaging hole of the rack member, and even when the rack member is further moved forward by the drive gear, the pin of the lever enters the first recess so as not to forward move the slider.

4. A device according to claim 1, wherein when the slider is located at a forward movement position, if the drive gear is rotated in reverse, the rack member is backward moved so that the slider is backward moved via the pin of the lever engaging with the engaging hole of the rack member.

5. A device according to claim 1, wherein while the rack of the rack member is mated with the drive gear via the pin of the lever by the rack member, the slider is returned to the initial position.

6. A device according to claim 1, wherein in a state that the slider is returned to the initial position, the slider is maintained in position by the pin of the lever engaging with the engaging hole of the slider, and
wherein if the rack member is out of engagement with the drive gear, the rack member is relatively moved on the slider by the elastic member so as to return to the initial position.

7. A device according to claim 1, wherein the slider is provided with the rack which is mated with the drive gear only at a position where the slider and the rack member have the same phase.

8. A device according to claim 2, wherein the detecting means for detecting insertion of the disk comprises a disk detection lever which rotates so as to push the rack member in the forward direction if the disk detection lever is pushed by the external periphery of the disk.

9. A device according to claim 1, further comprising:
a chuck attached at the extremity of a chuck lever for holding the disk to a turn table;
the elastic member; and
a switching member,
wherein the chuck lever is urged in the chucking direction by the elastic member while the switching member pushes up the chuck lever against the elastic member in a chucking-canceling direction, and
wherein if the slider moves forward, the switching member is moved in a direction opposite to the chucking-canceling direction.

10. A disk player comprising a chucking device that comprises:
a motor;
a drive gear driven by the motor;
a slider disposed slidably on the side of the drive gear;
a rack member arranged so as to have an engaging hole as well as to overlap the slider, and connected to the slider with an elastic member therebetween slidably relative to the slider, the rack member having a rack to be mated with the drive gear; and
a lever rotatably arranged so as to intersect the rack member and also having a pin engaging with an engaging hole of the slider and with said engaging hole of the rack member,
wherein the engaging hole of the rack member comprises a first recess for forward moving the rack member relative to the slider during forward moving and a second recess for holding the slider at an initial position with the pin of the lever therebetween by intersecting the engaging hole of the slider when the slider is located at the initial position, and
wherein the slider is forward moved via the rack member by the drive gear for chucking operation while the slider is backward moved by the drive gear for canceling the chucking operation.

11. A disk player according to claim 10, wherein the chucking device further comprises detecting means for detecting insertion of a disk, and
wherein the rack member is forward pushed and mated with the drive gear so as to move the rack member forward with the drive gear while the slider is forward moved via the pin of the slider engaging with the engaging hole of the rack member in operative association with detection by the detecting means.

12. A disk player according to claim 10, wherein at a forward movement position of the slider, the pin of the lever is located in an inlet of the first recess of the engaging hole of the rack member, and even when the rack member is further moved forward by the drive gear, the pin of the lever enters the first recess so as not to forward move the slider.

13. A disk player according to claim 10, wherein when the slider is located at a forward movement position, if the drive gear is rotated in reverse, the rack member is backward moved so that the slider is backward moved via the pin of the lever engaging with the engaging hole of the rack member.

14. A disk player according to claim 10, wherein while the rack of the rack member is mated with the drive gear via the pin of the lever by the rack member, the slider is returned to the initial position.

15. A disk player according to claim 10, wherein in a state that the slider is returned to the initial position, the slider is maintained in position by the pin of the lever engaging with the engaging hole of the slider, and
wherein if the rack member is out of engagement with the drive gear, the rack member is relatively moved on the slider by the elastic member so as to return to the initial position.

16. A disk player according to claim 10, wherein the slider is provided with the rack which is mated with the drive gear only at a position where the slider and the rack member have the same phase.

17. A disk player according to claim 11, wherein the detecting means for detecting insertion of the disk comprises a disk detection lever which rotates so as to push the rack member in the forward direction if the disk detection lever is pushed by the external periphery of the disk.

18. A disk player according to claim 10, further comprising:
a chuck attached at the extremity of a chuck lever for holding the disk to a turn table;
an elastic member; and
a switching member,
wherein the chuck lever is urged in a chucking direction by the elastic member while the switching member pushes up the chuck lever against the elastic member in the chucking-canceling direction, and
wherein if the slider moves forward, the switching member is moved in a direction opposite to the chucking-canceling direction.

* * * * *